US012760913B2

(12) United States Patent
Schwimmer et al.

(10) Patent No.: US 12,760,913 B2
(45) Date of Patent: Oct. 13, 2026

(54) WEARABLE COOLING DEVICE

(71) Applicants: Rachel Schwimmer, Santa Monica, CA (US); Ashley Elizabeth Berg, Brooklyn, NY (US); Drew Eric Lilley, Chatham, NJ (US); Nicholas Paul Demes, New York, NY (US); Daniel Harris, Philadelphia, PA (US); Samuel Gaardsmoe, Brooklyn, NY (US); Charles John Berg, Raleigh, NC (US)

(72) Inventors: Rachel Schwimmer, Santa Monica, CA (US); Ashley Elizabeth Berg, Brooklyn, NY (US); Drew Eric Lilley, Chatham, NJ (US); Nicholas Paul Demes, New York, NY (US); Daniel Harris, Philadelphia, PA (US); Samuel Gaardsmoe, Brooklyn, NY (US); Charles John Berg, Raleigh, NC (US)

(73) Assignees: Rachel Schwimmer, Venice, CA (US); Ashley Elizabeth Berg, Brooklyn, NY (US); Samuel Gaardsmoe, Philadelphia, PA (US)

( * ) Notice: Subject to any disclaimer, the term of this patent is extended or adjusted under 35 U.S.C. 154(b) by 115 days.

(21) Appl. No.: 18/607,833

(22) Filed: Mar. 18, 2024

(65) Prior Publication Data

US 2024/0219038 A1 Jul. 4, 2024

Related U.S. Application Data

(63) Continuation-in-part of application No. 16/257,328, filed on Jan. 25, 2019, now Pat. No. 11,946,479.

(Continued)

(51) Int. Cl.

| | |
|---|---|
| *F24F 1/04* | (2011.01) |
| *G04B 47/00* | (2006.01) |
| *G04G 21/04* | (2013.01) |

(52) U.S. Cl.
CPC ................ *F24F 1/04* (2013.01); *G04B 47/00* (2013.01); *G04G 21/04* (2013.01)

(58) Field of Classification Search
CPC ............... F04D 25/084; F04D 25/0673; A41D 13/0025; A41D 20/005; F24F 1/04
See application file for complete search history.

(56) References Cited

U.S. PATENT DOCUMENTS 5,802,865 A * 9/1998 Strauss ..................... A61F 7/10 62/259.3
6,311,497 B1 * 11/2001 Chung .................... F25B 21/04 62/3.5

(Continued)

*Primary Examiner* — Nelson J Nieves
(74) *Attorney, Agent, or Firm* — McCarter & English, LLP

(57) ABSTRACT

A wearable cooling device to restore and/or maintain a user's thermal comfort is provided. The wearable cooling device is versatile and may cool various locations on a user's body, e.g., wrist, neck and ankle. The wearable cooling device utilizes a forced air device, e.g., a fan, that blows air onto a wetted piece of media which is in direct contact with a high thermally conductive element that is in contact with a user's skin or with a user's outer clothing. The wetted media is situated between the forced air device and the high thermally conductive element. When the forced air device is activated, the exhaust air passes onto/around the wetted media, which cools the high thermally conductive element, thereby cooling down the user. The wearable cooling device may be combined with watch functionality and the relative positioning of the wearable cooling device and watch functionality may be controlled for user benefit.

17 Claims, 7 Drawing Sheets

Related U.S. Application Data

(60) Provisional application No. 62/623,158, filed on Jan. 29, 2018.

(56) References Cited

U.S. PATENT DOCUMENTS

| | | | | |
|---|---|---|---|---|
| 7,721,349 | B1 | 5/2010 | Strauss | |
| 7,785,359 | B2 | 8/2010 | Latham | |
| 7,866,177 | B2 | 1/2011 | Selm et al. | |
| 8,083,786 | B2 * | 12/2011 | Gafni | A61B 5/377 606/20 |
| 8,147,533 | B2 * | 4/2012 | Baxter | A61F 7/10 607/108 |
| 9,029,736 | B2 | 5/2015 | Lavin, Jr. | |
| 11,946,479 | B2 | 4/2024 | Schwimmer et al. | |
| 2004/0083526 | A1 | 5/2004 | Ichigaya | |
| 2005/0177925 | A1 * | 8/2005 | Peeples | A41D 23/00 2/321 |
| 2010/0185267 | A1 * | 7/2010 | Dickie | A61F 7/10 607/109 |
| 2010/0198322 | A1 * | 8/2010 | Joseph | A61F 7/007 607/108 |
| 2011/0034887 | A1 | 2/2011 | Forden et al. | |
| 2013/0087180 | A1 * | 4/2013 | Stark | H10N 10/13 136/205 |
| 2015/0101788 | A1 | 4/2015 | Smith et al. | |
| 2015/0230527 | A1 | 8/2015 | Branson | |
| 2017/0027053 | A1 | 1/2017 | Moczygemba | |
| 2017/0095367 | A1 * | 4/2017 | Lini | A61F 7/007 |
| 2018/0042761 | A1 * | 2/2018 | Smith | A44C 5/0007 |
| 2018/0147086 | A1 | 5/2018 | Evans et al. | |

* cited by examiner

WEARABLE COOLING DEVICE

CROSS-REFERENCE TO RELATED APPLICATIONS

The present application claims priority benefit to a US non-provisional patent application entitled "Wearable Cooling Device" which was filed on Jan. 25, 2019, and assigned Ser. No. 16/257,328, and which claimed priority benefit to a U.S. provisional patent application entitled "Wearable Cooling Device" which was filed on Jan. 29, 2018, and assigned Ser. No. 62/623,158. The entire contents of the foregoing non-provisional and provisional patent applications are incorporated herein by reference.

BACKGROUND

Wearable comfort, e.g., one's body temperature, is at the forefront of necessities and can be difficult to achieve in various environments, including indoor environments that share thermostats, e.g., office buildings or classrooms. Examples of Peltier-based thermoelectric modules employed to cool a user's wrist include U.S. Pat. No. 5,970,718 entitled "Personal Heat Control", the aforementioned US 2017/0027053 entitled "Thermoelectric Device Cooling System", and U.S. Pat. No. 10,182,937 entitled "Methods and Apparatuses for Manipulating Temperature".

Wearable cooling devices have been disclosed to be worn on the wrist, often with a preference to the inside or palm-side of the wrist, which is where one of the pulse points of the body is located, wherein pulse points are known for effective heat transfer for cooling or warming the body. An example includes U.S. Pat. No. 5,970,718 entitled "Personal Heat Control," which employs a thermoelectric cooling device on the inside of the wrist. Further, unitary combinations of a clock/timepiece/watch with a wrist-worn device into a single unit has been disclosed where the watch and cooling device are proximate or integrated with each other. Examples include: US 2004/0211189 entitled "Personal Heat Control Device and Method" (see, e.g., FIGS. 5A-C), US 2017/0095367 entitled "Body Temperature Regulating Device and Method) (see, e.g., paragraph [0026]), and US 2012/0318781 entitled "Electronic Personal Thermal Control Apparatus and System" (see, e.g., paragraph [0031]).

While a watch may be integrated or attached to a wearable cooling device, the unitary combination of a watch with a wrist-worn cooling device can provide the user either a suboptimal watch experience or suboptimal cooling experience because the inside of the wrist provides the most effective cooling, but is a less-preferred watch location as the majority of watch users wear their watch on the backside of the wrist, not the inside. Conversely, it is easier for many users to view the watch display when the unitary combination of a watch and wrist-worn cooling device is located on the backside of the wrist as that side of the wrist is more often in the user's view during various user activities, but this location diminishes the effectiveness of cooling.

SUMMARY

The present disclosure relates to a wearable cooling device that is designed to rapidly restore and/or maintain a user's thermal comfort. The disclosed wearable cooling device is versatile and may be affixed to or in contact with (or close proximity to) a variety of locations on a user's body, e.g., wrist, neck and ankle, among others. For better results, the disclosed wearable cooling device is generally in direct contact with a user's skin; however, exemplary embodiments of the disclosed wearable cooling device are effective for use when not in direct contact with—but in proximity to—a user's skin.

In an exemplary embodiment, the wearable cooling device utilizes a forced air device, e.g., a fan, that blows air onto a wetted piece of media, e.g., fabric, which is in direct contact with a high thermally conductive element, e.g., copper or aluminum. The high thermally conductive element may be in contact with a user's skin or with a user's outer clothing. The wetted media is situated between the forced air device and the high thermally conductive element. When the forced air device is activated, the exhaust air passes onto and around the wetted media, which in turn cools the high thermally conductive element. As a result, the high thermally conductive element cools down the user.

Additional features, functions and advantages associated with the disclosed wearable cooling device will be apparent from the description which follows, particularly when read in conjunction with the appended figures.

BRIEF DESCRIPTION OF FIGURES

To assist those of ordinary skill in the art in making and using the disclosed wearable cooling device, reference is made to the appended figures, wherein.

DETAILED DESCRIPTION

Figure 1:
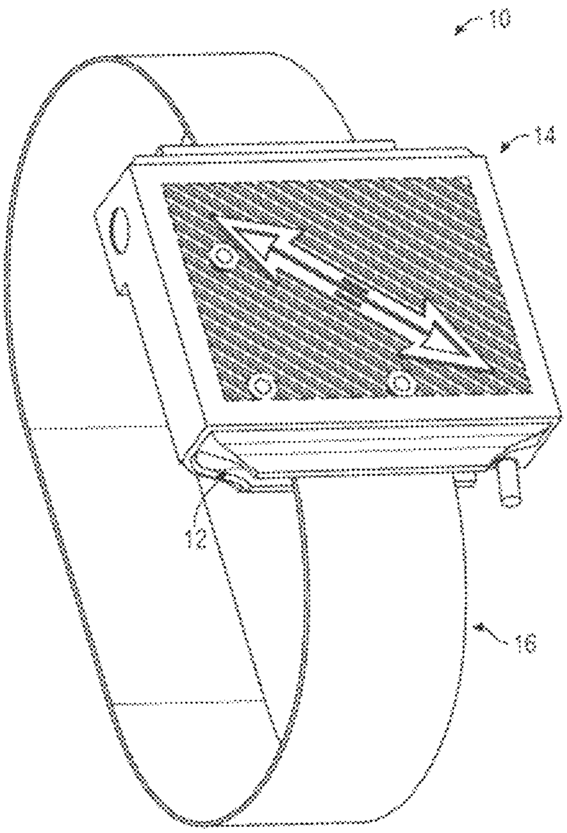
FIG. 1 is a perspective view of an exemplary wearable cooling device according to the present disclosure.

In an exemplary embodiment, a wearable cooling device according to the present disclosure includes a housing that encompasses at least one forced air device, e.g., a fan, and a wetted media, e.g., fabric, that is situated between the forced air device(s) and at least one high thermally conductive element. The wearable cooling device further generally includes a reservoir for holding a liquid that is wicked through the media. The reservoir is generally adapted to be refilled on an as-needed basis. In an exemplary embodiment, water is wicked through a fabric made from regenerated cellulose fiber, e.g., Rayon. However, additional liquid and media can be utilized, as will be apparent to persons skilled in the art.

As used herein, the term media refers to a material that may include at least one of the following structural forms: fabric, pad, woven, non-woven, solid, fibrous, perforated, permeable, impermeable, variable permeability, porous, non-porous, variable porosity, closed-cell foam, open-cell foam, layering, corrugate or flute, layers of corrugate or flute, cross-fluted structure (e.g., honeycomb), or a combination thereof. Such layers, corrugations, flutes, and cellular layers may be substantially parallel, perpendicular, or angled with reference to the direction of the forced air flow. However, additional media may be utilized without departing from the spirit/scope of this disclosure.

In an exemplary embodiment, the media may be absorbent and/or adsorbent. More particularly, the media may be an evaporative media that promotes evaporative cooling. The terms media and evaporative media may be used interchangeably without departing from the spirit/scope of this disclosure. The various structural forms, as mentioned above, may promote turbulent air flow in order to improve the liquid evaporation rate.

The media may be a combination of one or more synthetic and/or natural compositional components, such as in a homogenous or heterogeneous relationship, or a combination thereof. For example, the media may be fabricated from at least one of the following compositional components, including rayon, e.g., viscose, cotton, cellulose, sponge, pulp, fluff pulp, paper, polyethylene, polypropylene, polyethylene terephthalate, polyester, polyolefin, or a combination thereof. The above-mentioned components are merely examples to help persons skilled in the art design and fabricate the embodiments discussed in this disclosure; however, additional components may be used as will be apparent to persons skilled in the art. The media may further include, within and/or on one or more surfaces, a wetting aid, e.g., a surfactant, to reduce the surface tension of the media, thereby promoting additional wetting of the media.

Of note, the use of the term "liquid" also includes "evaporative liquid" and the terms may be used interchangeably without departing from the spirit/scope of the disclosure. The liquid may include water, alcohol, hygiene agents (as discussed below), or a combination thereof. A water blend may include a percentage of water that is greater than or less than the additional constituents. Specifically, water may constitute at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, 60, 61, 62, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100 percent of the liquid mass or liquid volume at room temperature, or decimal interval therein.

To reinforce the media when wet or dry, a media reinforcing material may be used to provide mechanical strength to the media. The media reinforcing material may be continuous or non-continuous through at least one portion of the media or may reinforce the entire media. For example, the media reinforcing material may include fibers, threads, strands, crystalline domains, scrims, netting, or a combination thereof. The composition of said media reinforcing material may include synthetic or natural material components, including rayon, e.g., viscose, cotton, cellulose, sponge, pulp, fluff pulp, paper, polyethylene, polypropylene, polyethylene terephthalate, polyester, polyolefin, fiberglass, metal (e.g., aluminum, copper, steel), glass, or a combination thereof. The above-mentioned media reinforcing materials are merely examples to help persons skilled in the art design and fabricate the embodiments discussed in this disclosure; however, additional media reinforcing materials may be used as will be apparent to persons skilled in the art. The media reinforcing material may further retain and/or transport liquid(s), including evaporative liquid(s), however, retention and/or transportation of liquid(s) is not required.

In another exemplary embodiment, the media may include, e.g., treated with, one or more hygiene maintenance agents. The term hygiene maintenance agents, as used herein, refers to a material or chemical that deters and/or eliminates the formation of unwanted/unhealthy biological organisms. The material or chemical may be included in, on the surface of, or in close proximity to the media and/or the liquid. For example, the hygiene maintenance agent may include bactericides, anti-microbial agents, germicides, herbicides, antibiotics, antivirals, biocides, fungicides, antifungals, algicides, anti-fouling agents, insecticides, pesticides, antiparasitics, disinfectants, vinegar, or a combination thereof. The above-mentioned hygiene maintenance agents are merely examples to help persons skilled in the art design and fabricate the embodiments discussed in this disclosure; however, additional hygiene maintenance agents may be used as will be apparent to persons skilled in the art.

In an exemplary embodiment, the amount of the hygiene maintenance agent within the media and/or within the liquid will evaporate and/or be consumed at a rate similar to the liquid. More preferably, the hygiene maintenance agent will be consumed and/or evaporated at a rate less than the liquid; without substantially affecting the hygienic performance characteristics of the hygiene maintenance agent. If incorporated within the liquid, the hygiene maintenance agent may be combined at a ratio of 1:1, 1:2, 1:3, 1:4, 1:5, 1:6, 1:7, 1:8, 1:9, 1:10, 1:11, 1:12, 1:13, 1:14, 1:15, 1:16, 1:17, 1:18, 1:19, 1:20, 1:21, 1:22, 1:23, 1:24, 1:25, 1:26, 1:27, 1:28, 1:29, 1:30, 1:31, 1:32, 1:33, 1:34, 1:35, 1:36, 1:37, 1:38, 1:39, 1:40, 1:41, 1:42, 1:43, 1:44, 1:45, 1:46, 1:47, 1:48, 1:49, 1:50, 1:51, 1:52, 1:53, 1:54, 1:55, 1:56, 1:57, 1:58, 1:59, 1:60, 1:61, 1:62, 1:63, 1:64, 1:65, 1:66, 1:67, 1:68, 1:69, 1:70, 1:71, 1:72, 1:73, 1:74, 1:75, 1:76, 1:77, 1:78, 1:79, 1:80, 1:81, 1:82, 1:83, 1:84, 1:85, 1:86, 1:87, 1:88, 1:89, 1:90, 1:91, 1:92, 1:93, 1:94, 1:95, 1:96, 1:97, 1:98, 1:99, 1:100, 100:1, 99:1, 98:1, 97:1, 96:1, 95:1, 94:1, 93:1, 92:1, 91:1, 90:1, 89:1, 88:1, 87:1, 86:1, 85:1, 84:1, 83:1, 82:1, 81:1, 80:1, 79:1, 78:1, 77:1, 76:1, 75:1, 74:1, 73:1, 72:1, 71:1, 70:1, 69:1, 68:1, 67:1, 66:1, 65:1, 64:1, 63:1, 62:1, 61:1, 60:1, 59:1, 58:1, 57:1, 56:1, 55:1, 54:1, 53:1, 52:1, 51:1, 50:1, 49:1, 48:1, 47:1, 46:1, 45:1, 44:1, 43:1, 42:1, 41:1, 40:1, 39:1, 38:1, 37:1, 36:1, 35:1, 34:1, 33:1, 32:1, 31:1, 30:1, 29:1, 28:1, 27:1, 26:1, 25:1, 24:1, 23:1, 22:1, 21:1, 20:1, 19:1, 18:1, 17:1, 16:1, 15:1, 14:1, 13:1, 12:1, 11:1, 10:1, 9:1, 8:1, 7:1, 6:1, 5:1, 4:1, 3:1, 2:1, or a decimal interval therein.

Furthermore, as used herein, the term "high thermally conductive element" refers to an element, e.g., material, that rapidly transfers heat sufficient to enhance the ability of the media to evaporate the liquid. The high thermally conductive element may include aluminum, beryllium, bismuth, bronze, chromium, copper, gallium, iron, lead, magnesium, manganese, silicon, silver, titanium, vanadium, zinc, zirconium, or a combination thereof. The thermal conductivity of silver approaches 430 watts/meter-Kelvin at 300° K. In exemplary embodiments, the high thermally conductive element is fabricated from aluminum, silver and copper alloys. The above-mentioned materials are merely examples to help persons skilled in the art design and fabricate the embodiments discussed in this disclosure; however, additional materials may be used as will be apparent to persons skilled in the art. The high thermally conductive element may be in the form of a solid, band, ribbon, weave, braid, strand, or a combination thereof. Of note, the terms "high thermally conductive element," "conductive element," and any other variation are used interchangeably without departing from the spirit/scope of the disclosure. In an exemplary embodiment, the high thermally conductive element has a thermal conductivity of at least 50 watts/meter-Kelvin, at a temperature between 273° Kelvin ("K") to 300° K and at atmospheric pressure. Preferably, the thermal conductivity is 50 watts/meter-K to 425 watts/meter-Kelvin. More preferably, the thermal conductivity is 50 watts/meter-K to 430 watts/meter-Kelvin. Additionally, the high thermally conductive element may be non-metallic and may include carbon nanotube and graphene structures.

The disclosed wearable cooling device is versatile and may be affixed to or in contact with (or close proximity to) a variety of locations on a user's body, e.g., wrist, neck, ankle, among others. The disclosed wearable cooling device may be attached with respect to a user's body in various ways, e.g., by one or more straps, clips, belts, lanyards, bands, cuffs, scarves, ties, rings, bracelets, anklets, necklaces, elastic bands, elastic cords, metal segment expansion bands comprised of various material compositions, shapes and forms, and degrees of elasticity and/or similar attachment means as will be apparent to persons skilled in the art. Further, one or more additional disclosed wearable cooling devices may also be affixed to or in contact with (or close proximity to) at similar or different locations on a user's body which may be beneficial at times by or to the user.

Of note, the use of the term "body" does not necessarily only include a user's skin, but can also include a user's clothing or other outer garments. Examples of clothing and outer garments include, but are not limited to: tops including t-shirts, blouses, shirts, sleeves, crop tops, tank tops, tunics, sweaters, cardigans, hoodies, sweatshirts, coats, jackets and vests; bottoms including pants, shorts, jeans, skirts and dresses; undergarments including bras, panties, boxers, briefs, undershirts, and undershorts; headgear including hats, visors, beanies, helmets, head bands, head ties and scarves; footwear including socks, hose, shoes and boots; and handwear including gloves, mittens and wraps. The preferred location on a user's body should be close to or in contact with a portion of the circulatory system, e.g., arteries or veins, specifically because the human (and other mammals') body is more sensitive in those locations and will experience thermal comfort quicker. However, the present disclosure is not limited by or to such preferred positioning of the disclosed device.

Figure 2:
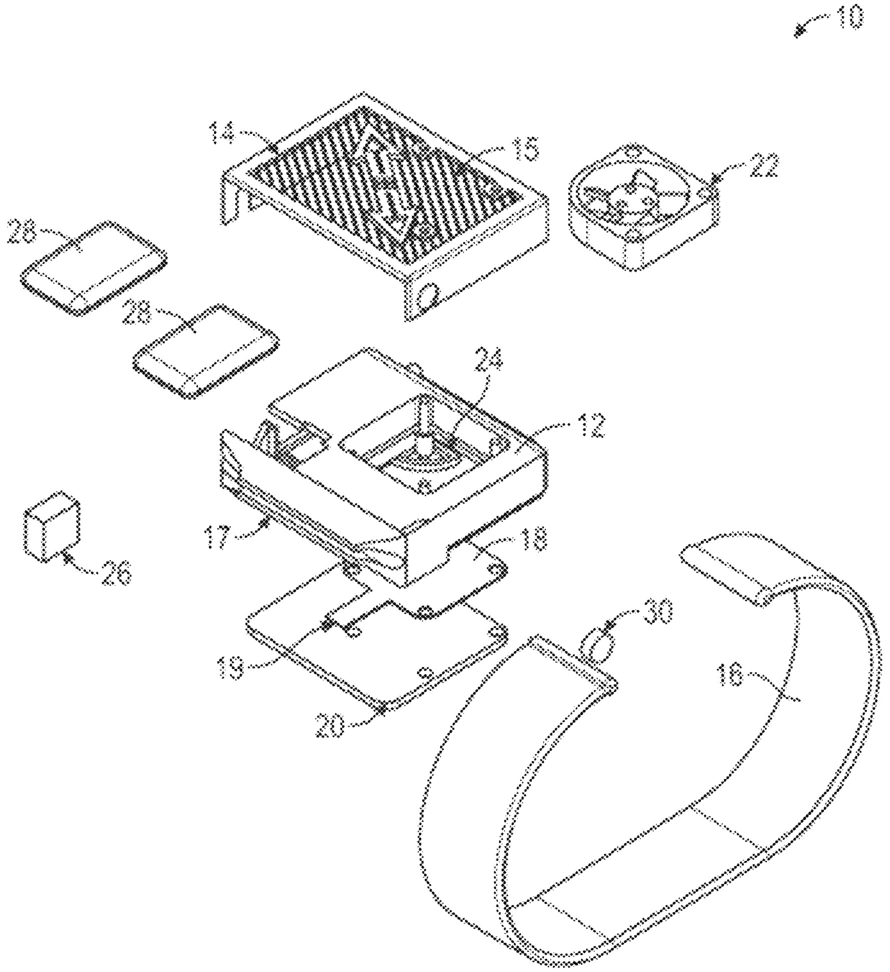
FIG. 2 is an exploded view of an exemplary wearable cooling device according to the present disclosure.
Figure 3:
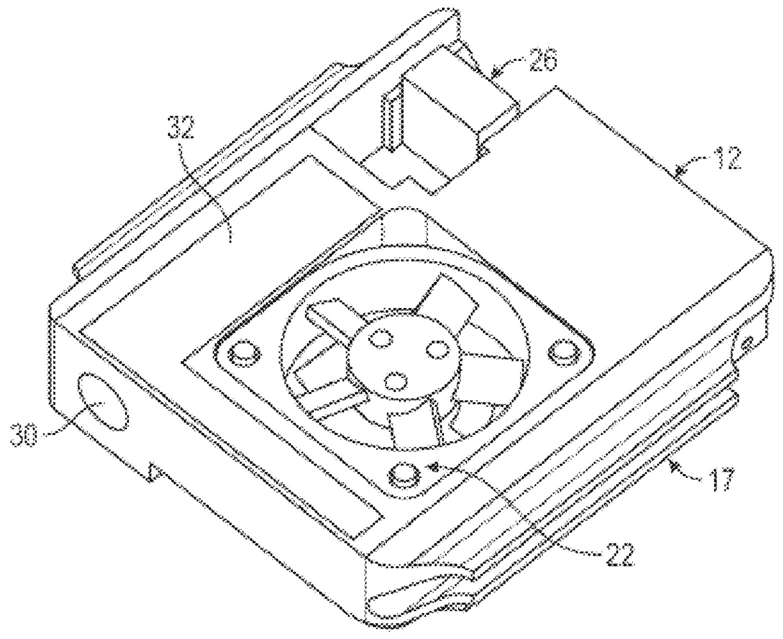
FIG. 3 is a perspective view of an exemplary housing of a wearable cooling device according to the present disclosure.

With reference to FIGS. 1-3, an exemplary embodiment of the disclosed wearable cooling device 10 is schematically depicted. In the exemplary embodiment, the wearable cooling device 10 is intended to be worn on the inside portion of a user's wrist. Strap 16 connects to two opposing edges of housing 12 and forms a loop, adjustable in diameter, so as to fit any wrist size. Strap 16 resembles a watch strap and can be a single loop expandable strap, e.g., a flexible material, or two separate straps that connect together around any size wrist; e.g., with a clasp or a hook and loop attachment mechanism. In one embodiment, each end of strap 16 slides into a complementary slot 17, e.g., a radiused slot, that is located on two opposing edges of housing 12. Complementary slot 17 promotes changeability of various strap 16 designs.

Cover 14 is provided for detachable attachment to housing 12 so as to encase certain internal components of device 10. In the exemplary embodiment depicted in FIGS. 1-3, cover 14 features several slats 15 that enable the forced air device (not pictured) to pull fresh air from outside housing 12 to force through at least a portion of wearable cooling device 10. In the exemplary embodiment, slats 15 are angularly oriented relative to the sides of cover 14. However, alternative venting features may be incorporated into cover 14 to permit forced air flow therethrough, as will be readily apparent to persons skilled in the art.

FIG. 2 schematically depicts exemplary wearable cooling device 10 in an exploded view. In an exemplary embodiment, media 18 is situated between housing 12 and high thermally conductive element 20, e.g., copper. In an exemplary embodiment, a media regenerated from purified cellulose, e.g., dissolving wood pulp, may be used. Rayon, e.g., Lyocell, is a high absorbent media that further provides for an even liquid distribution throughout the media and features strong mechanical properties when wet. However, additional and/or alternative media or materials may be utilized, as discussed above, and as will be apparent to persons skilled in the art. Of note, a material with strong mechanical properties refers to a material that maintains and/or improves its mechanical properties, e.g., structural and visual integrity, prior to, during, and/or after operation(s). Specifically, media 18 is in contact with a liquid release outlet (not pictured) of a reservoir (not pictured) located within housing 12. A liquid, e.g., water, is then transported from the reservoir and through the liquid release outlet into contact with media 18. Such transportation may be accomplished through wicking, including capillary action and/or surface tension transport, among others.

In the exemplary embodiment, media 18 is substantially square in geometry, but features tab portion 19 that captures the liquid from the liquid release outlet (not pictured) and evenly distributes the liquid through at least a portion of media 18. A sealed connection between tab portion 19 and the liquid release outlet ensures effective transfer of liquid from the reservoir (not pictured) to media 18. In an exemplary embodiment, the reservoir is lined with media 18 to promote liquid transportation in any orientation. The flow of the liquid is controlled by the inherent properties of media 18. Specifically, since media 18 promotes wicking of the liquid, media 18 thus extracts the liquid from the reservoir to prevent drying out.

Forced air device 22, e.g., a fan, is positioned within cavity 24 formed or defined in housing 12. Cavity 24 features a mounting interface to capture forced air device 22 and a semi-exposed base that facilitates airflow passthrough. In an exemplary embodiment, forced air device 22 blows air through the semi-exposed base onto the wetted media 18, which in turn cools down media 18 through liquid evaporation and associated heat release through such phase change operation. Since high thermally conductive element 20 is in contact with the cooled down media 18, high thermally conductive element 20 subsequently cools down as a result of its thermal conductive properties. More particularly, in connection with the liquid vaporization, heat is transferred from thermally conductive element 20, thereby causing thermally conductive element 20 to cool down. The user generally does not feel any wetness on his/her skin, but merely feels the coolness of high thermally conductive element 20.

To ensure the inlet to forced air device 22 has proper air flow, cover 14 includes slats 15 or other airflow opening(s) that partially expose forced air device 22 to ambient air. Furthermore, excess exhaust air from forced air device 22 that does not contact media 18 and/or high thermally conductive element 20 can provide additional cooling to a user. Forced air device 22 may be adjustably controlled by a potentiometer 26 that is mounted within housing 12. Additional control features may be incorporated, as will be apparent to persons skilled in the art.

To power forced air device 22, at least one battery 28 is electrically generally connected to the components. Additional batteries 28, as pictured, may be incorporated based on electrical requirements. Battery 28 may be rechargeable or disposable. Furthermore, for those users that are close to an external power source, e.g., computer or wall plug, wearable cooling device 10 may be charged and/or powered by plugging the device in. Additionally, the components of two or more disclosed wearable cooling devices worn by the user may share the at least one battery by both being electrically generally connected to the at least one battery.

In an exemplary embodiment, wearable cooling device 10 features feedback capabilities. A temperature sensing device (not pictured) may be affixed to high thermally conductive element 20 to measure the user's skin temperature. When wearable cooling device 10 is not active, but is in direct contact with the user's skin (or in close proximity thereto), the temperature of high thermally conductive element 20 would reflect the user's skin temperature.

Wearable cooling device 10 may further include a controller (not pictured) to receive the user's skin temperature measurement, compare that measurement with predetermined individualized temperature thresholds, and respond accordingly. For instance, if the user's skin temperature is above the user's predetermined temperature threshold, a signal may be sent to the controller to activate forced air device 22 to cool down the user and/or to change the operating speed of forced air device 22. Similarly, the signal can cause a modification to the airflow passage(s), e.g., by partially opening or closing the passage(s) to permit greater or lesser airflow therethrough. Besides skin temperature, the controller may respond to information received from other sensors or user inputted feedback that can help assess the user's degree of thermal comfort/discomfort, e.g., skin flush can be measured by IR and other sensors, sweating can be measured by galvanic skin resistance, and humidity of clothing airspaces can be measured.

In another exemplary embodiment of the present disclosure, an additional sensor may be attached to cover 14 to measure the ambient temperature of a room. In doing so, the wearable cooling device 10 would resemble a thermostat, predicting, based on the ambient temperature of the room and the user's skin temperature, when forced air device 22 should activate and for what duration. Furthermore, in another embodiment, wearable cooling device 10 may include a heating element (not pictured) that would heat a portion of the device and transfer that heat through high thermally conductive element 20 to the user. The heating element (not pictured) may be incorporated within wearable cooling device 10 to heat the liquid prior to contacting media 18. The heating element (not pictured) may also be attached to media 18 to heat media 18 after it has been exposed to the liquid.

FIG. 3 depicts a cross-section of an assembled housing 12 according to the present disclosure. As was previously discussed, forced air device 22 interfaces with the dimensionally similar cavity of housing 12. Substantially surrounding forced air device 22 is reservoir 32. The volume of liquid within reservoir 32 depends on the size of wearable cooling device 10. For example, wearable cooling device 10 to be worn on a user's wrist may have 5 milliliters ("mL") of liquid. The reservoir volume, however, regardless of wearing location, may be 1 mL, 2 mL, 3 mL, 4 mL, 5 mL, 6 mL, 7 mL, 8 mL, 9 mL, 10 mL, 11 mL, 12 mL, 13 mL, 14 mL, 15 mL, 16 mL, 17 mL, 18 mL, 19 mL, 20 mL, 21 mL, 22 mL, 23 mL, 24 mL, 25 mL, 26 mL, 27 mL, 28 mL, 29 mL, 30 mL, or a greater volume that exceeds 30 mL, and any interval in between. Furthermore, incorporated into a side wall of housing 12, that abuts reservoir 32, is a reservoir plug 30 that provides access to reservoir 32, e.g., filling or emptying the reservoir.

The disclosed wearable cooling device may be referred to as a powered wearable cooling device. As used herein the term "powered wearable cooling device" or PWCD refers to a personal cooling device where at least one element of the PWCD is powered by the at least one battery with a power switch available to the user to switch the power on and off to the device, wherein the PWCD is positioned for thermal interface with the user's body. PWCDs include thermoelectric cooling devices/functionalities and evaporation cooling devices/functionalities with either unpowered passive and/or powered active liquid transport from a reservoir to a media situated between a forced air device and a high thermally conductive element wherein active liquid transport is powered by work from a human or a machine, such as a pump to move liquid away from the reservoir towards the media. The evaporation cooling device utilizes a powered forced air device, powered by at least one battery, that blows air onto a wetted piece of media which is in direct contact with a high thermally conductive element which is positioned for thermal interface with the user's body. Further, the evaporation cooling device includes a reservoir for holding liquid to transport to the wetted media as needed, wherein the reservoir is generally adapted to be refilled on an as-needed basis with liquid supplied by the user or liquid available for purchase which is produced by a manufacturer. In addition, the reservoir is generally adapted to be replaceable, such as when it is empty or near-empty of liquid and another reservoir filled with liquid is placed into the device. The "replacement" reservoir may be available for purchase prefilled with liquid from a manufacturer. Likewise, the media may be replaceable with new media available for purchase which was produced by a manufacturer to fit the device.

Evaporation cooling devices with passive liquid transport include those that transport liquid from the reservoir to the media, e.g., by gravity or wicking such as the disclosed wearable cooling device and its exemplary implementations. Passive transport may be responsible for varying portions/percentages of the transport distance from the reservoir to the media, e.g., the entire distance, a majority of the distance (greater than 50%), half the distance, or a minority of the distance (less than 50%). The passive transport distance may support transport over the entire distance, or approach the entire distance (e.g., on the order of 90%), or the passive transport distance may be relatively limited (e.g., on the order of 10%). The passive liquid transport may be effective to contribute to delivery of varying volumes of liquid from the reservoir to the media and at varying transport rates.

Evaporation cooling devices with active liquid transport include those that pump liquid through at least one liquid-communication conduit from the reservoir to the media. Active transport may be responsible for varying portions/percentages of the transport distance from the reservoir to the media, e.g., the entire distance, a majority of the distance (greater than 50%), half the distance, or a minority of the distance (less than 50%). In exemplary embodiments, the active transport distance may approach the entire distance (e.g., on the order of 90%), or the active transport distance may be relatively limited (e.g., on the order of 10%). The active liquid transport may be effective to contribute to delivery of varying volumes of liquid from the reservoir to the media and at varying transport rates. Examples of pumps for active liquid transport include hand-powered pumps including squeeze-bulb pumps, and battery-powered pumps including positive displacement pumps, such as lobe and peristaltic pumps, micropumps including diaphragm, peristaltic and piezoelectric micropumps.

Active transport and passive transport may both contribute to liquid transport, whether concurrently, sequentially or intermittently, at any given point along the transport distance from the reservoir to the media. For example, an evaporation cooling device may pump liquid through a liquid-communication conduit from the reservoir to the media and, where the reservoir is located above the media, gravity may further contribute to liquid transport at the same time. Thus, the liquid may be transported both by gravity, i.e., passive transport, and by a pump, i.e., active transport.

Evaporation cooling devices that include active liquid transport may allow for the reservoir to be located some distance from the media and the housing on the user's body, thereby allowing location of one or more reservoirs on the user's body which may also comfortably hold large volumes of liquid per reservoir, e.g., volumes of at least 30 mL, including volumes up to 5000 mL, and any volume interval in between. Thus, for example, one or more reservoirs may be located as part of or attached to a worker or military uniform. Hybrid-transport evaporation cooling devices include both passive and active liquid transport. For example, a worker or military helmet may constitute a hybrid-transport evaporation cooling device where a liquid reservoir is located proximate the top-most region of the helmet and wherein both a battery-powered pump and gravity contribute to transport of liquid from the reservoir to the media and housing lower down on the helmet. For example, the housing may be connected to the inside of the helmet or a helmet liner below the top-most region of the helmet. Alternatively for the helmet example, the liquid may be transported by one or more of any passive and active liquid transport means as will be apparent to persons skilled in the art.

A watch may be associated with a PWCD, wherein the watch includes one or more of a personal data transmitter or display. The watch display may make visible to the user one or more time functions and/or "smart" functions in a digital or analog format. The watch may include one or more batteries, including a shared or dedicated battery that may function as reserve power for a PWCD. The availability of reserve power may be beneficial to address the power needs of thermoelectric cooling. Time functions may include the current time in the user's time zone, time in another time zone, date, an alarm clock, countdown timer, and/or a timer, such as a stopwatch, for displaying elapsed time, including individual lap or event times. "Smart" functions may include health monitoring, such as heart rate, respiratory rate, skin temperature, body temperature, biosensor data, activity level (s); GPS location; communications via the use of electromagnetic spectrum frequencies, including cellular, WiFi, Bluetooth and near-field communication; audio; and applications (also known as "apps"). A personal data transmitter may be provided to wirelessly send data about the user to another device, such as a smartphone, tablet, personal computer or third party service(s) (subscription or non-subscription based third party service(s)), either directly or via a network. The data receiving device or service generally includes specialized software including 'apps' to store and analyze the personal data for contemporaneous or later display or other communication means of the personal data or one or more analyses of the personal data to the user or another person, such as a family member, caregiver or healthcare worker.

Personal data collected and sent by the personal data transmitter may include location tracking, environment tracking including air temperature and humidity, fitness and health activity tracking, including heart rate, skin temperature, sweating, sleep movement and snoring, heart rate variability which can indicate stress levels, respiratory rate and blood oxygen levels. Personal data transmitters may include at least one user manipulable input element, such as a two or more position button, switch or toggle which may turn on or off the personal transmitter's power, personal data collection, e.g. sensors, or transmission of the collected data of the personal data. Personal data transmitters may include indicator lights or other viewable or auditory indication means so that at any moment the user can ascertain the on/off status of power, battery(ies) charge level, personal data collection, and/or transmission of the collected data. Personal data transmitters, such as fitness, activity and health trackers often design the tracker to be worn on the backside of the wrist as opposed to the inside of the wrist. The sensors associated with the device are often located biased toward the side of the tracker which contacts the user's skin.

In an exemplary embodiment, a wrist wearable combination article of a PWCD and a watch are provided. The wrist wearable combination article, or wrist wearable device, includes a PWCD and a watch which are positioned about the same wrist via means of attachment that locates the PWCD in approximate opposition to the watch, thereby allowing effective use of a cooling thermal interface with the inside of a user's wrist while the watch is proximate the backside of the wrist. This arrangement allows for both effective cooling and efficient viewing of the watch, and ease of manipulation of any user manipulable input elements by the user. This arrangement also permits/supports effective user monitoring by personal data transmitters with sensors, such as fitness, activity and health trackers. Thus, while the PWCD is positioned on the inside of the wrist for cooling, the watch is positioned on the backside of the wrist, allowing the user to more readily manipulate any input elements and note displays or other indicators of the watch. For example, one or more appropriate time functions, aside from the date, will allow the user to more readily note the times that the PWCD has been powered on for cooling or powered off, and decide whether to take action to adjust the degree of cooling, e.g., by turning off or turning on the power to the PWCD. Likewise, display of one or more health monitoring "smart" functions will be more readily noted by the user and may factor into a decision by the user to adjust the degree of cooling, e.g., by turning on or turning off the power to the PWCD. As a further example, the user can readily note and confirm or change the on/off status of power, personal data collection, transmission of the collected data according to whether the PWCD is cooling or not. The terms wrist wearable combination article, combination article and wrist wearable device may be used interchangeably without departing from the spirit/scope of this disclosure. The combination article may include functionality that permits connection of the PWCD and/or the watch by a wire or cable for communication and/or electrical connectivity purposes. Examples of the means of attachment that locates the PWCD in approximate opposition to the watch includes, but are not limited to: straps, clips, belts, lanyards, bands, cuffs, scarfs, ties, rings, bracelets, elastic bands, elastic cords, metal segment expansion bands comprised of various material compositions, shapes and forms, and degrees of elasticity and/or similar attachment means.

Figure 4:
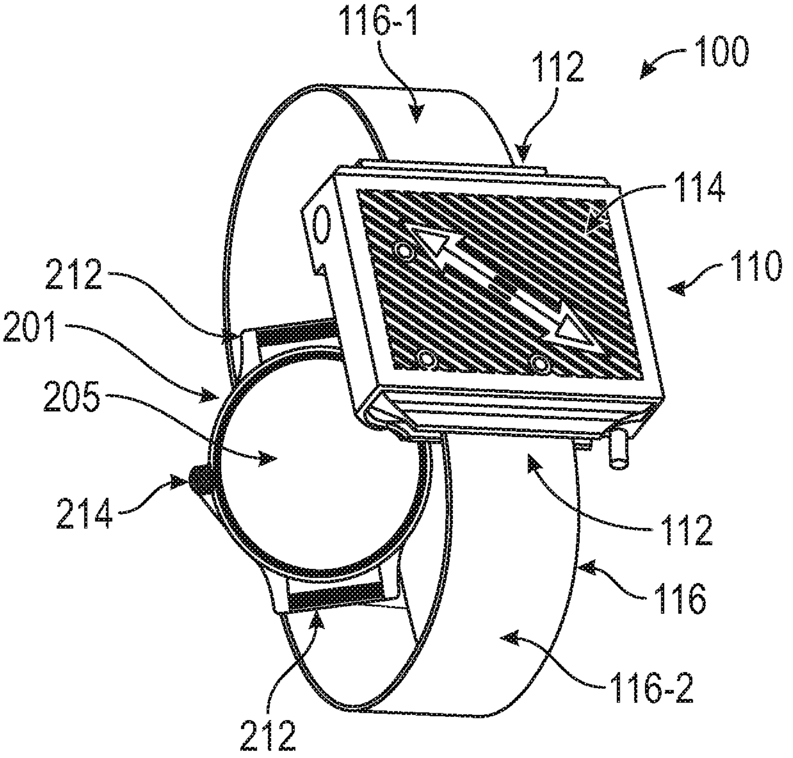
FIG. 4 is a perspective view of an exemplary combination article configured to be worn on the wrist of a user.

With reference to FIG. 4, an exemplary embodiment of the disclosed combination article 100 configured to be worn on the user's wrist is schematically depicted with PWCD 110 and watch 201 connected to strap 116. The PWCD 110 and watch 201 are about opposite to one another when worn, wherein the opposing edges 112 of PWCD 110 and the opposing edges 212 of watch 201 are connected to strap 116. The combination article 100 is preferably worn such that the PWCD 110 is located on the inside of the wrist and the watch 201 is located on the backside of the wrist.

Strap 116 may be adjustable in diameter so as to fit the user's wrist . The back 205 of the watch is shown with an adjustment stem or crown 214 on the side which can be used to adjust the time functions of the watch, such as time and date. The strap of the combination article may include segments, for example in FIG. 4, the strap 116 includes segments 116-1 and 116-2. The segments may be of different forms, shapes or cross-sections, or colors versus one another, or the segments may comprise similar or different materials e.g., segment 116-1 may include leather while segment 116-2 may include silicone elastomer. In such exemplary implementation, segment 116-1 will be more stiff while segment 116-2 will provide greater elasticity which could aid in placing and removing the combination article 100 about the wrist.

Figure 5:
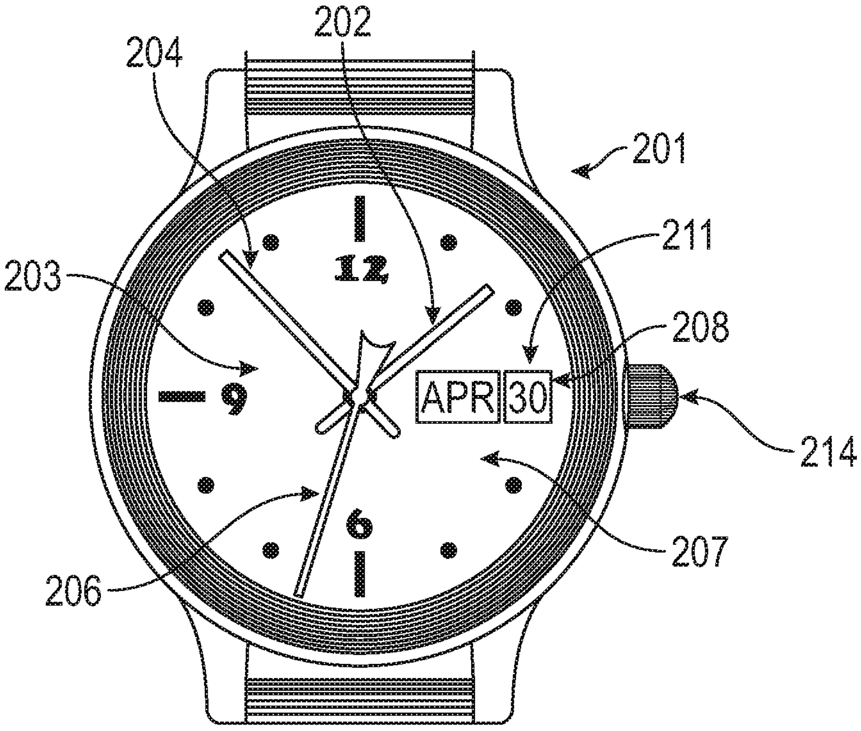
FIG. 5 is a plan view of the face of a watch associated with a combination article.

FIG. 5 is a plan view of the face 203 of watch 201 with an analog clock dial 207, hour hand 202, minute hand 204 and second hand 206 and date indicator 208 appearing through an aperture 211 pierced in clock dial 207. The adjustment stem 214 is to the side of the watch. Other parts (not shown) of the watch 201 include the casing, battery, and the watch movement. The watch may be assembled from components apparent to persons skilled in the art and the display features may vary, as is known in the watch industry (e.g., digital display).

Figure 6:
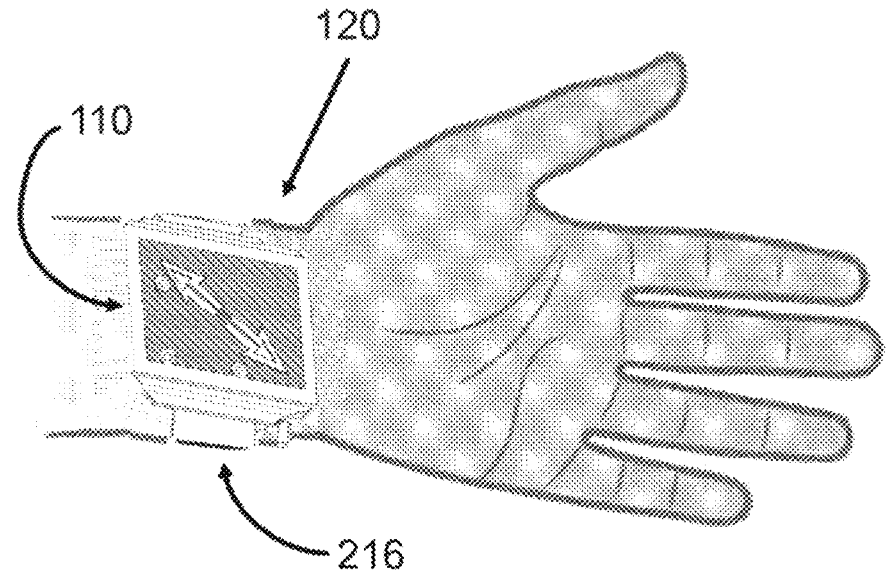
FIGS. 6 and 7 are schematic views of a combination article positioned relative to the wrist of a user.
Figure 7:
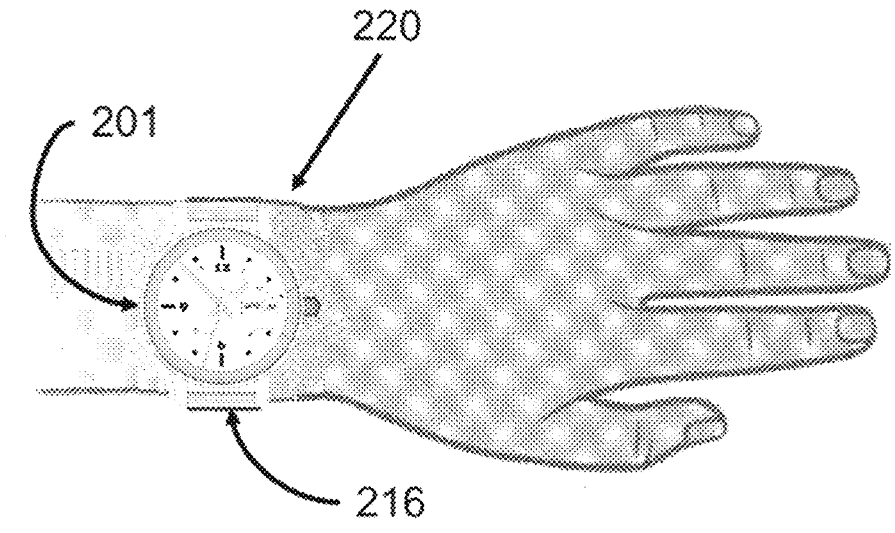

FIGS. 6 and 7 show beneficial orientations of the combination article 100 with the PWCD 110 located at/near the inside of the wrist 120, while the watch 201 is worn at/near the backside of the wrist 220.

Figure 8:
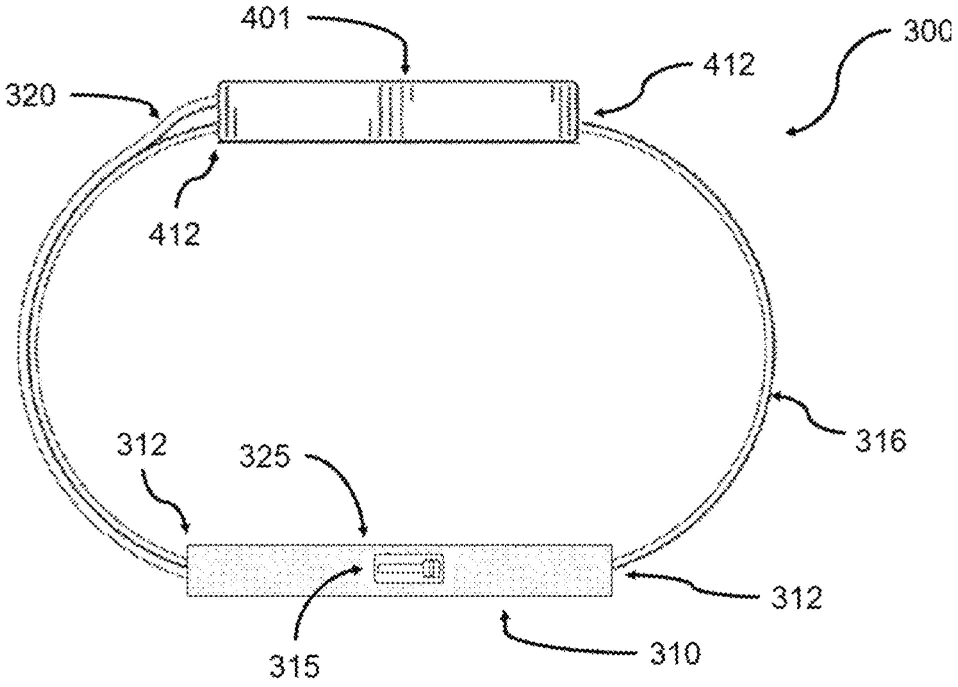
FIG. 8 is a side view of an alternative combination article configured to be worn on the wrist of a user.

With reference to FIG. 8, another exemplary embodiment of the disclosed combination article 300 configured to be worn on a user's wrist is schematically depicted. The PWCD 310 with power switch 315 and watch 401 is connected to strap 316 about opposite one another when worn, wherein the opposing edges 312 of PWCD 310 and the opposing edges 412 of watch 401 are connected to strap 316. The combination article 300 is preferably worn such that the PWCD 310 with cold face 325 is located on the inside of the wrist and the watch 401 is located on the backside of the wrist. The PWCD 310 is a Peltier-based thermoelectric device of the type disclosed herein.

Strap 316 may be adjustable in diameter so as to fit the user's wrist. Optional connecting wire or cable 320 connects between the watch 401 and PWCD 310 to provide electrical and signal communication between the devices. Overall, one or more optional connecting wires between the watch and the PWCD allow the watch and PWCD to share power from one or more batteries and/or data signals, including communication of at least one time or smart function to an optional controller of the PWCD. Data signals, including at least one of time and/or smart functions, may also be communicated wirelessly between the watch and the PWCD. Controller functions may include managing the rate of cooling including but not limited to: the various functions of the controller associated with the disclosed wearable cooling device as described herein, turning power on or off to the PWCD powered elements, changing the amperage or voltage supplied to the PWCD powered elements, creating a sequence of two or more maximum thermal cooling pulses with intermittent periods of no or reduced supplied cooling e.g., 30 second thermal cooling pulses with intermittent periods of 30 seconds with no cooling. The controller may manage the rate of cooling in response to feedback, such as changes in temperature of the user's skin at one or more places on the body, or user feedback communicated to the PWCD by audio input, signaled input from a communication device, such as a smartphone, physical input such as manipulating buttons or dials, or user input inputted into the PWCD, as would be apparent to persons skilled in the art.

Figure 9:
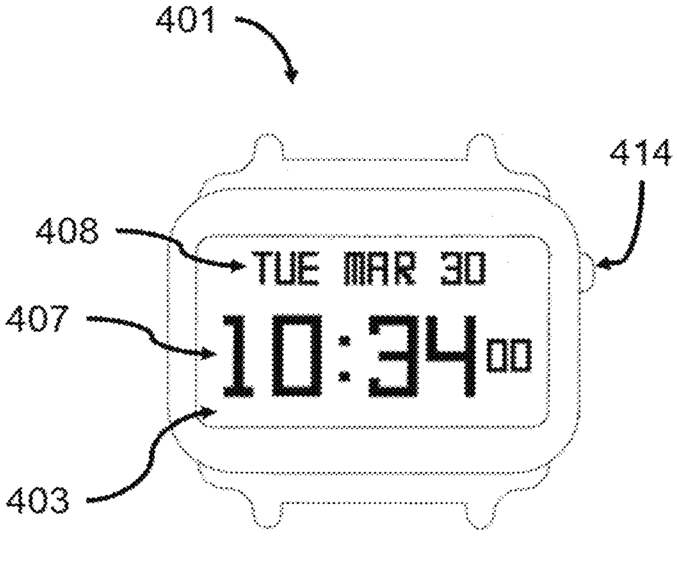
FIG. 9 is a plan view of a watch face associated with a combination article.

FIG. 9 is a plan view of the digital face 403 of watch 401 with a display array of characters 407 which indicate hours, minutes and seconds. Another display array of characters 408 indicates the day of the week, month and day of the month. The adjustment button 414 is to the side of the watch. Other parts of the watch 401 include the casing, battery, and the watch circuits. The watch may be assembled from conventional components, as are known to persons skilled in the art.

Figure 10:
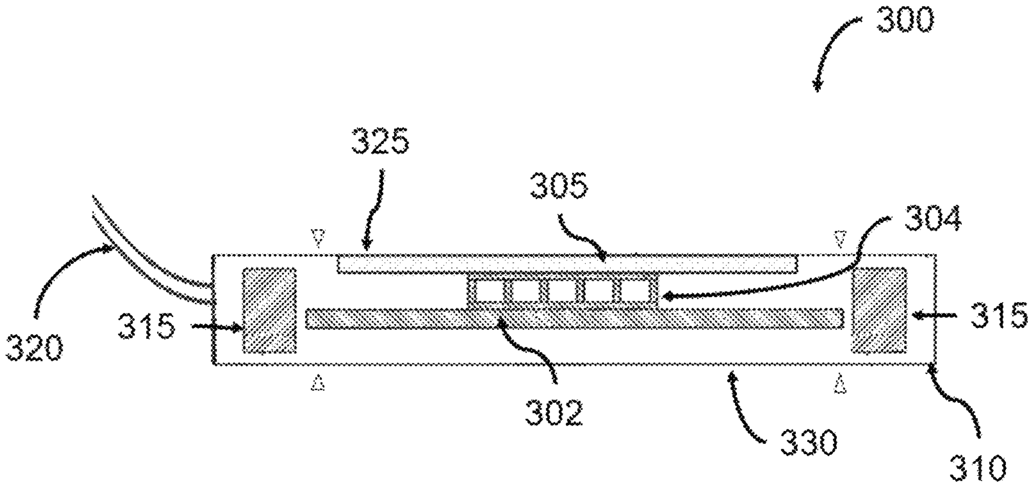
FIG. 10 is a cross-section view of a thermoelectric device according to the present disclosure.
Figure 11:
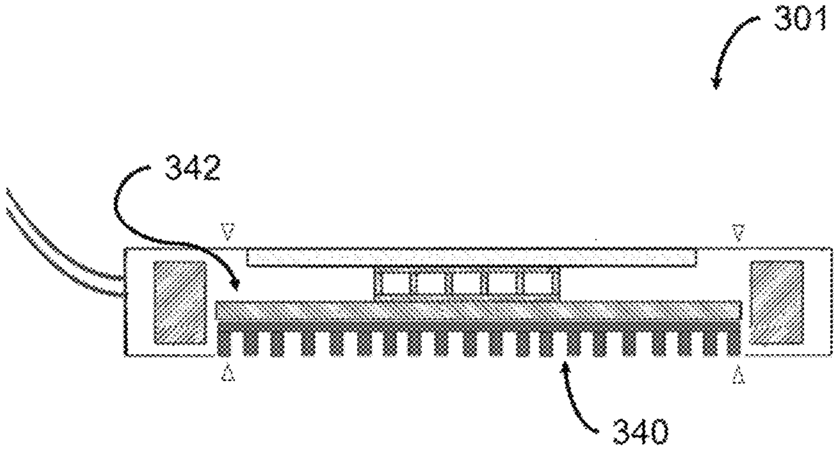
FIG. 11 is a cross-section of a thermoelectric device that shows heat sink fins.

FIG. 10 is a cross-section side view of the thermoelectric device 300 with connecting wire 320, one or more thermoelectric modules 304, electrical-insulating and thermal-conducting plates 302 and 305 typically containing ceramic material on the hot and cold sides of the thermoelectric module 304. The thermoelectric device 300 includes one or more batteries 315, a housing 310 made from soft or hard material that encases the device except where the hot exhaust face 330 and the cold face 325 are exposed with the cold face 325 positioned for thermal interface with the user's wrist, preferably the inside wrist. Cold face 325, as denoted between the two marker arrowheads, is in thermal contact with cold side plate 305 and has a thermal conductivity of 50-430 watts/meter-Kelvin at a temperature between 273° K and 300° K. The various thermal conductor materials described hereinabove may be used in assembling thermoelectric device 300. The task of the hot exhaust face 330, which in this embodiment is a cover with venting hole (not shown), direct cooling by the air to remove the exhaust heat produced by the thermoelectric module 304 from the hot side plate 302. Alternative approaches may be implemented to remove the exhaust heat, e.g., powered airflow, evaporation systems, heat sink fins, etc. FIG. 11 shows a cross-section side view of the thermoelectric device 301 highlighting the addition of heat sink fins 340 in contact with the hot side electric-insulating and thermal-conducting plate 342.

Although the present disclosure has been described with reference to exemplary implementations, the present disclosure is not limited by or to such exemplary implementations. Rather, various modifications, refinements and/or alternative implementations may be adopted without departing from the spirit or scope of the present disclosure.

The invention claimed is:

1. A wearable device to be worn on a user's body, comprising:
- a housing defining a reservoir for receipt of a liquid;
- a forced air device positioned within the housing;
- a thermally conductive element mounted with respect to the housing and positioned for thermal interface with the user's body, the thermally conductive element having a thermal conductivity of 50-430 watts/meter-Kelvin, at a temperature between 273° K and 300° K, which enables heat transfer away from skin of the user for the user to feel a coolness from contact with the thermally conductive element;

a wetted media positioned within the housing, the wetted media (i) in fluid communication with liquid received by the reservoir, and (ii) in direct contact with the thermally conductive element for direct thermal communication with the thermally conductive element; and means for attaching the housing with respect to the user's body;

wherein the thermal conductivity of the thermally conductive element enables the thermally conductive element to cool down based on heat transfer to the wetted media, wherein operation of the forced air device effects evaporative cooling through liquid evaporation from the wetted media and, based on direct thermal communication between the wetted media and the thermally conductive element, effects cooling of the thermally conductive element positioned for thermal interface with the user's body, and wherein the housing is configured to be attached relative to a wrist, neck or ankle of the user's body.

2. The wearable device according to claim 1, wherein the thermally conductive element is fabricated in whole or in part from the group consisting of aluminum, beryllium, bismuth, bronze, chromium, copper, gallium, iron, lead, magnesium, manganese, silicon, silver, titanium, vanadium, zinc, zirconium, carbon nanotube, graphene, and any combination thereof.

3. The wearable device according to claim 1, further comprising means for detachably attaching the housing with respect to the user's body.

4. The wearable device according to claim 3, wherein the means for detachably attaching the housing with respect to the user's body is selected from the group consisting of a strap, a clip, a loop expandable strap, and straps that connect to each other with a clasp or a hook attachment mechanism.

5. The wearable device according to claim 1, wherein the means for attaching is selected from the group consisting of one or more bands, cuffs, scarfs, ties, rings, bracelets, anklets and necklaces.

6. The wearable device according to claim 1, wherein the housing is configured to be attached relative to the skin of the user's body.

7. A wearable device to be worn on a user's body, comprising:

a housing defining a reservoir for receipt of a liquid;

a forced air device positioned within the housing;

a thermally conductive element mounted with respect to the housing and positioned for thermal interface with the user's body, the thermally conductive element having a thermal conductivity of 50-430 watts/meter-Kelvin, at a temperature between 273° K and 300° K, which enables heat transfer away from skin of the user for the user to feel a coolness from contact with the thermally conductive element;

a wetted media positioned within the housing, the wetted media (i) in fluid communication with liquid received by the reservoir, and (ii) in direct contact with the thermally conductive element for direct thermal communication with the thermally conductive element; and means for attaching the housing with respect to the user's body;

wherein the thermal conductivity of the thermally conductive element enables the thermally conductive element to cool down based on heat transfer to the wetted media, wherein operation of the forced air device effects evaporative cooling through liquid evaporation from the wetted media and, based on direct thermal communication between the wetted media and the thermally conductive element, effects cooling of the thermally conductive element positioned for thermal interface with the user's body, and wherein the housing is configured to be attached relative to an outer garment or clothing associated with the user's body.

8. The wearable device according to claim 7, wherein the outer garment or clothing is selected from the group consisting of a tee-shirt, blouse, shirt, sleeve, crop top, tank top, tunic, sweater, cardigan, hoodie, sweatshirt, coat, jacket, vest, pants, shorts, jeans, skirt, dress, bra, pantie, boxer, brief, undershirt, undershort, hat, visor, beanie, helmet, head band, head tie, scarf, sock, hose, shoe, boot, glove, mitten and wrap.

9. A wearable device to be worn on a user's body, comprising:

a housing defining a reservoir for receipt of a liquid;

a forced air device positioned within the housing;

a thermally conductive element mounted with respect to the housing and positioned for thermal interface with the user's body, the thermally conductive element having a thermal conductivity of 50-430 watts/meter-Kelvin, at a temperature between 273° K and 300° K, which enables heat transfer away from skin of the user for the user to feel a coolness from contact with the thermally conductive element;

a wetted media positioned within the housing, the wetted media (i) in fluid communication with liquid received by the reservoir, and (ii) in direct contact with the thermally conductive element for direct thermal communication with the thermally conductive element; and means for attaching the housing with respect to the user's body;

wherein the thermal conductivity of the thermally conductive element enables the thermally conductive element to cool down based on heat transfer to the wetted media, wherein operation of the forced air device effects evaporative cooling through liquid evaporation from the wetted media and, based on direct thermal communication between the wetted media and the thermally conductive element, effects cooling of the thermally conductive element positioned for thermal interface with the user's body, and further comprising a second housing that defines a second wearable device that is configured to be mounted with respect to the user's body.

10. The wearable device according to claim 9, wherein the housing and the second housing are powered by at least one battery.

11. The wearable device according to claim 1, further comprising a control system for (i) measuring at least one of a temperature of skin of the user's body and an ambient temperature, and (ii) controlling operation of the forced air device in response to the measured temperature.

12. The wearable device according to claim 1, wherein the wetted media is fabricated in whole or in part from the group consisting of fabric, pad, woven, non-woven, solid, fibrous, perforated, permeable, impermeable, variable permeability, porous, non-porous, variable porosity, closed-cell foam, open-cell foam, layering, corrugate or flute, layers of corrugate or flute, cross-fluted structure, and any combination thereof.

13. The wearable device according to claim 1, wherein the wetted media is fabricated in whole or in part from the group consisting of rayon, viscose, cotton, cellulose, sponge, pulp, fluff pulp, paper, polyethylene, polypropylene, polyethylene terephthalate, polyester, polyolefin, and any combination thereof.

14. The wearable device according to claim 1, wherein the housing further includes a heating device.

15. The wearable device according to claim 1, wherein the liquid comprises water, alcohol, hygiene agents, and any combination thereof.

16. The wearable device according to claim 1, further comprising a media reinforcing material for providing mechanical strength to the wetted media.

17. A method for adjusting temperature conditions of a user's body, the method comprising:

attaching a wearable device in contact or in close proximity to skin of a wrist, neck or ankle of a user or to an outer garment or clothing associated with the user's body, the wearable device including (i) a housing defining a reservoir containing a liquid, (ii) a forced air device positioned within the housing, (iii) a thermally conductive element mounted with respect to the housing and positioned for thermal interface with the user's body, the thermally conductive element having a thermal conductivity of 50-430 watts/meter-Kelvin, at a temperature between 273° K and 300° K, and (iv) a wetted media positioned within the housing, the wetted media in fluid communication with liquid received by the reservoir, and in direct contact with the thermally conductive element for direct thermal communication with the thermally conductive element;

activating the forced air device of the wearable device to adjust skin conditions of the user, wherein the wearable device adjusts the skin conditions of the user based on forced air passage over the wetted media that is in fluid contact with the liquid, and effectuating a cooling effect based on direct heat transfer from the thermally conductive element to the wetted media and vaporization of the liquid from the wetted media to effect evaporative cooling;

wherein the thermal conductivity of the thermally conductive element enables the thermal conductive element to cool down based on heat transfer to the wetted media.

* * * * *